(12) United States Patent
Sokol et al.

(10) Patent No.: US 6,259,055 B1
(45) Date of Patent: Jul. 10, 2001

(54) APODIZERS FOR LASER PEENING SYSTEMS

(75) Inventors: David Sokol; Jeffrey L. Dulaney, both of Dublin; Patrick Kenney, Powell; Steven M. Toller, Grove City, all of OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 09/178,967

(22) Filed: Oct. 26, 1998

(51) Int. Cl.[7] .................................................. B23K 26/00
(52) U.S. Cl. ................................. 219/121.68; 219/121.69
(58) Field of Search .......................... 219/121.68, 121.69; 359/739, 888, 894

(56) References Cited

U.S. PATENT DOCUMENTS

| | | | |
|---|---|---|---|
| 3,935,545 | * | 1/1976 | Campillo et al. . |
| 3,977,772 | * | 8/1976 | Rimmer et al. . |
| 4,030,817 | * | 6/1977 | Westell . |
| 4,243,942 | * | 1/1981 | Glass . |
| 4,935,932 | * | 6/1990 | Johnson et al. . |
| 4,937,421 | * | 6/1990 | Oritz, Jr. et al. ............... 219/121.68 |
| 5,859,424 | * | 1/1999 | Norton et al. . |
| 6,008,941 | * | 12/1999 | Feldman et al. . |

* cited by examiner

Primary Examiner—Geoffrey S. Evans
(74) Attorney, Agent, or Firm—Randall J. Knuth

(57) ABSTRACT

A method and apparatus for improving the functionality, quality, and usefulness of a beam of coherent energy used in laser shock processing by utilizing an apodizer within the oscillator or amplifier of a laser. The apodizer used may be a phase plate, a serrated aperture, a birefringent beam shaper, an absorbent graded aperture, a reflective graded aperture, or a combination thereof. A method and apparatus for reducing or preventing damage to an oscillator and an amplifier utilizes an apodizer.

58 Claims, 3 Drawing Sheets

APODIZERS FOR LASER PEENING SYSTEMS

BACKGROUND OF THE INVENTION

1. Field of the Invention

The present invention relates to modifying the pulse of coherent energy used in shock processing of solid materials, and more particularly to methods and apparatus for improving the functionality, quality, and usefulness of a pulse of coherent energy in laser shock processing.

2. Description of the Related Art

Laser shock processing involves directing a pulse of coherent radiation to a piece of solid material to produce shock waves therein. The produced shock wave causes compressive residual stresses to form within the solid material. These compressive residual stresses improve the fatigue hardness and corrosion resistance properties of the solid material.

Laser shock processing utilizes a laser comprised of an oscillator, amplifiers, lenses, and irises. Depending on the type of oscillator used and the aperture size of the oscillator, the laser beam is either of a single transverse mode or a multi-transverse mode.

One problem with current lasers used in laser shock processing is potential damage that may occur to components downstream of a hard iris. Traditionally, the iris used in a laser is composed of a hard material, such as aluminum. When a laser beam exceeds the diameter of a hard iris, the intensity of the beam downstream is modulated and diffraction fringes are formed. The fringing is produced by diffracted coherent light interfering with the main beam. The diffraction fringes create hot spots, or areas of higher energy. These hot spots may lead to optical damage in components downstream or upstream. For example, amplified diffraction fringes may lead to damage to the laser gain medium or to laser optical components and their coatings.

An additional problem with current hard irises is that there is an increase in divergence of the beam as the beam passes through the hard iris. The divergence of the beam alters how the beam propagates, which in turn, produces a less uniform spacial distribution of beam output. The resulting beam output from a laser utilizing a hard iris is less effective in laser shock processing as compared to a more uniform spacial energy distribution of a non-diffracted beam output.

Another problem with current lasers used in laser shock processing is the creation of hot zones. This is especially a problem in multi-transverse mode laser oscillators. In multi-transverse mode oscillator lasers, areas of higher amplitude or hot zones, naturally occur on the outside edges of a cross-section of a laser beam. Amplification of a laser beam with hot zones further increases these hot zones which may result in possible damage to the optical components of the laser.

SUMMARY OF THE INVENTION

The present invention is a method and apparatus for reducing damage to a laser and its components in laser shock processing by reducing or eliminating diffraction fringes. In one specific embodiment of the present invention, an apodizer is used to improve the functionality, quality, and usefulness of a pulse of coherent energy used in laser shock processing. An apodizer is a device that scatters selected parts of a laser beam that passes through it. Because the edge of the apodizer is not smooth, any scattered light that reenters the main beam is now out of phase with respect to this beam. As a consequence, standing diffraction rings are significantly reduced or eliminated.

The invention, in one form thereof, is an apparatus for laser shock peening a workpiece. The apparatus includes a laser oscillator and amplifier means for increasing the energy of a laser pulse. There is a means for preventing damage to one of the laser oscillator and amplifier means. In alternate embodiments, the laser oscillator is either a single-transverse mode or a multi-transverse mode oscillator. In another embodiment, the means for preventing damage to the laser oscillator and the amplifier means comprises an apodizer and in a further embodiment, the apodizer may be one of the following: a phase plate, a serrated aperture, a birefringent beam shaper, an absorbent graded aperture or a reflective graded aperture.

The invention, in another form thereof, is an apparatus for laser peening a workpiece comprising a laser oscillator and an apodizer disposed within the laser oscillator. The apparatus also includes an amplifier means for increasing the energy of a laser pulse.

The invention, in yet another form thereof, is an apparatus for laser peening a workpiece comprising a laser oscillator and an amplifier means to increase the energy of a laser pulse. An apodizer is disposed within the amplifier means. In alternate embodiments, the apodizer may be a phase plate, a serrated aperture, a birefringent beam shaper, an absorbent graded aperture, or a reflective graded aperture.

In yet another embodiment, the present invention includes a method for laser peening a workpiece. The method includes generating a laser pulse from an oscillator. The laser pulse is modified to prevent damage to the oscillator and the pulse is amplified by the amplifier. The pulse is directed to the workpiece in one specific embodiment. In one embodiment, the laser pulse is modified to prevent damage to oscillator by including an apodizer within the oscillator. In an alternate embodiment, the method includes the step of modifying the laser pulse to prevent damage to the amplifier.

The invention, in another form thereof, is a method for laser peening a workpiece. The method includes the steps of locating an apodizer within an oscillator and generating a laser pulse from the oscillator. The pulse is amplified and directed to the workpiece. In alternate embodiments, the apodizer is one of a phase plate, a serrated aperture, a birefringent beam shaper, an absorbent graded aperture, or a reflective graded aperture.

The invention, in yet another form thereof, is a method for laser peening a workpiece. The method includes generating a laser pulse from an oscillator. An apodizer is located within the amplifier means and the laser pulse is amplified. The laser pulse is directed to the workpiece.

One advantage of the present system is the elimination of diffraction fringes. Diffraction fringes cause hot spots or hot areas of higher energy as measured across the laser beam cross-section. When these hot spots are amplified, the resulting beam may damage the optics and other components of the laser. In one embodiment, an apodizer is used to reduce or eliminate such diffraction fringes.

Another advantage of the present invention is that the divergence of the laser beam is not increased. Energy diverted from the beam pathway could be reflected back into the path of the laser, which in turn, may cause damage to optical components of the laser. Therefore, a decrease in divergence of the laser decreases the possibility of potential damage to laser components by such diverging beam.

An additional advantage of the present invention is the increase in energy uniformity of the beam output. Traditional lasers used in laser shock processing use a hard iris, with smooth edges, that increases the divergence of the beam and produces hot spots across the beam's cross-section. The present invention, in one embodiment, utilizes an apodizer, rather than a hard iris. As a result, hot spots are reduced thereby leading to a more uniform beam output.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
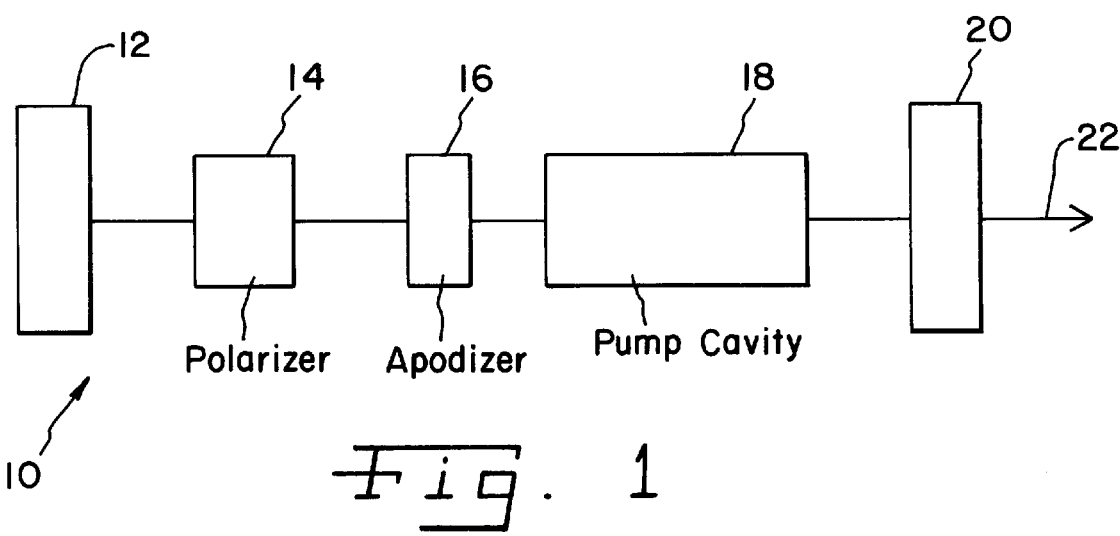
FIG. 1 is a diagrammatic view of a laser oscillator of the present invention.

The present invention in one embodiment thereof is depicted in FIG. 1. Laser oscillator 10 comprises a high reflective mirror 12 which operates as one end of the laser oscillator 10. Continuing in the beam path from reflective mirror 12, in order, are a polarizer 14, an apodizer 16, a pump cavity 18, and a output coupler 20 which operates as a terminator for defining the laser oscillator 10. The laser beam exits oscillator 10 through output coupler 20 as depicted by arrow 22.

Figure 2:
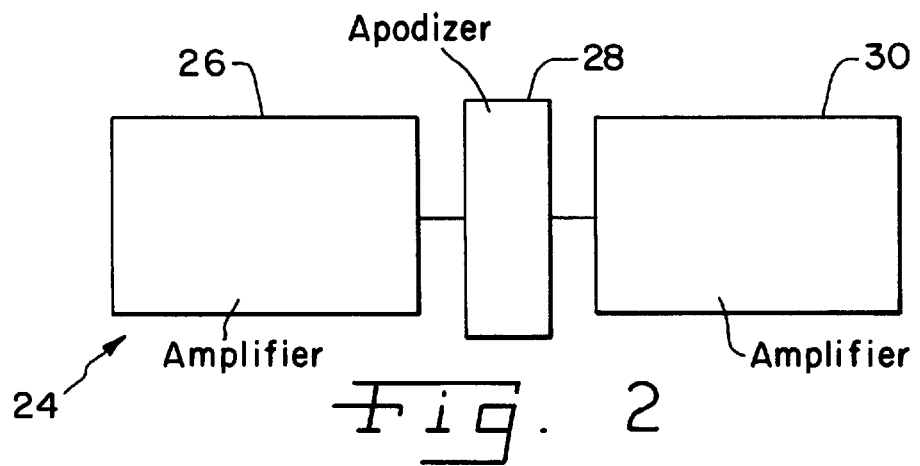
FIG. 2 is a diagrammatic view of amplifying means used in the present invention.

Referring now to FIG. 2, amplifier means 24 increases or amplifies the laser beam. Amplifier means 24 comprises a first amplifier 26, apodizer 28, a second amplifier 30, and other optical components (not shown). The function of apodizer 28 is to adjust the diameter of the beam out of amplifier means 24 for efficient amplification in amplifier 30. Apodizer 28 reduces the potential damage to optical components and creates substantial uniformity in intensity throughout the laser beam cross-section. Optical components include lenses, polarizers, apodizers, output coupler, and 90 degree rotators and any other optical components in the beam path. Additional amplifying means can be used to increase beam energy to processing requirements.

Figure 3:
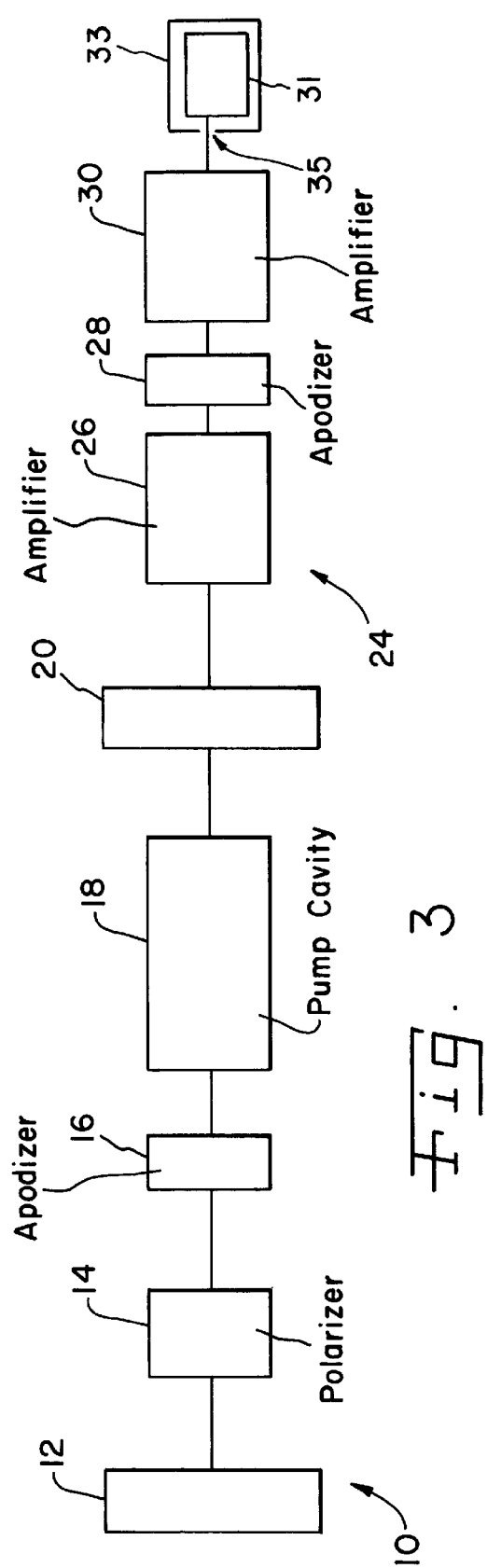
FIG. 3 is a diagrammatic view of a laser oscillator and amplifier used in the present invention.

Referring now to FIG. 3, there is shown an oscillator 10 combined with amplifier means 24. While FIG. 3 depicts the present invention as containing both oscillator apodizer 16 and amplifier apodizer 28, the present invention does not require the presence of both apodizers 16, 28 to be used simultaneously. Alternatively, a plurality of apodizers may be used within oscillator 10 and amplifier means 24. During the operation of the present invention, a beam of coherent energy is generated within oscillator 10. As the beam of coherent energy oscillates between reflector 12 and output coupler 20, the beam passes through oscillator apodizer 16 and a substantially spatially uniform beam is produced. The beam proceeds from oscillator 10 to amplifier means 24 where its amplitude is amplified. Although amplifier apodizer 28 is depicted as being between first amplifier 26 and second amplifier 30, amplifier apodizer 28 may be located before the first amplifier 26 or after second amplifier 30. Additional amplification means and apodizers can be placed after amplifier 30.

When the present invention is used in laser shock processing, workpiece 31 is located in laser peening cell 33. Laser peening cell 33 protects operators and equipment from injury or damage during laser shock processing. Laser cell 33 contains window 35 which permits a beam of coherent energy to enter laser cell 33. Compressive residual stresses are introduced into workpiece 31 by directing a beam of coherent energy through window 35 to workpiece 31.

The present invention may also include a laser pulse-sharpening device (not shown). The laser pulse-sharpening device shortens the rise time of the leading edge of the laser beam. The resulting pulse of coherent energy which is generated by the combination of oscillator 10 with amplifier means 24 is used in laser shock processing a metallic material.

Oscillator apodizer 16 and amplifier apodizer 28 modify the laser beam pulses by passing the beam through a device with a radius smaller than that of the laser beam pulse. As a result, the outermost edge of a cross section of a beam is filtered and removed from the beam.

When a laser pulse is generated, there will be variations in energy amplitude across the diameter of the generated laser pulse. It is optimal to have a uniform amplitude of energy across the diameter of the laser pulse. For example, in a single traverse-mode oscillator, the intensity or amplitude of energy across the diameter of the beam is lesser on the edges and higher in the center of the laser pulse. In a single transverse-mode oscillator laser, the apodizer removes the lower intensity areas of the laser pulse which are located on the outside edges of a laser pulse when viewed across its diameter.

In a multi-mode oscillator, the amplitude increases to form a peak, slightly decreases, and then increases to a second peak before falling off as viewed across a laser beam cross-section. Oscillator apodizer 16, in a multi-transverse mode oscillator, reduces the peaks in amplitude or hot shots which are present in the oscillator.

These hot spots can cause damage to laser optics such as the output coupler, polarizer or apodizer located either within the oscillator itself, or within the laser amplifier. Apodizer 16 filters out and removes a portion of the laser beam located on the outside of the laser beam cross-section. Consequently, the hot zones located on the outside portion of the beam are removed. Once the hot spots have been clipped from the laser beam pulse, a resulting uniform spatial beam is generated having a substantially flat or level amplitude across the diameter of the laser beam. Since there is a level amplitude across the diameter of the laser pulse, potential damage to gain medium and other laser optical components or their coatings is reduced or eliminated. Amplifier apodizer 28 has a similar effect on a laser beam pulse to produce a uniform spatial beam when the laser beam is amplified.

Figure 4:
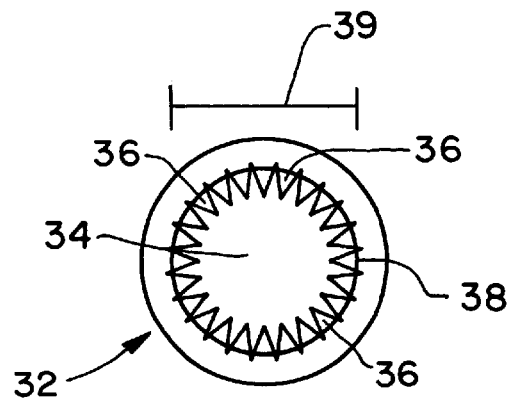
FIG. 4 is a cross-sectional view of a serrated aperture.

Oscillator apodizer 16 and amplifier apodizer 28 may be constructed in various forms. Referring to FIG. 4, oscillator apodizer 16 for example, could be serrated aperture 32. A serrated aperture 32 is an apodizer containing an iris 34 with inward projecting serrations or teeth 36. A laser beam 38 having a diameter 39 is directed toward serrated aperture 32. Photons pass freely through the interior of iris 34. Photons that scatter from the serrated edge of 37 and reenter the main beam are no longer in phase with this beam. As a result, interference effects are reduced or eliminated. The net effect of serrated aperture 32 is a smooth transition from the center iris 34 to the outside edge where serrations 36 are located. As a result, the potential damage to components of the laser by diffraction rings is reduced or eliminated.

Figure 5:
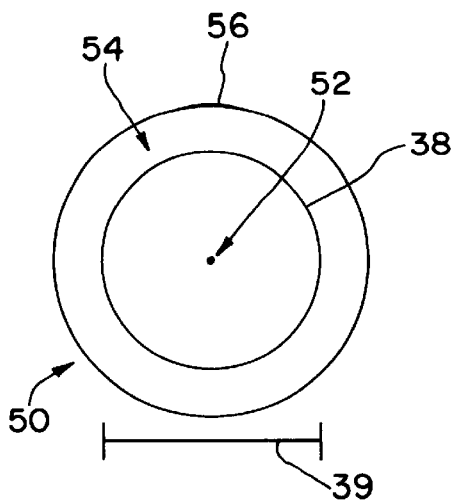
FIG. 5 is a cross-sectional view of an absorbent graded aperture.

Referring now to FIG. 5, oscillator apodizer 16 and amplifier apodizer 28 may be an absorbent graded aperture 50. Absorbent graded aperture 50 contains a center point 52 which is near 100 percent transparent to a laser beam. From a predetermined radius and proceeding in ever increasing radii is applied an absorbent material 54 in an increasing quantity. This creates an absorbent gradient from near 0 percent absorbency at or near the center point 52 to near 100 percent absorbency at absorbent graded aperture outer edge 56. The resulting absorbent gradient provides for a soft iris. Photons from the center of beam diameter 39 pass freely through the center of aperture 52. Photons on the outside of diameter 39 of beam 38 become absorbed by absorbent material 54. Absorbent material 54 may be composed of any material which absorbs the energy from a laser beam. One possible material could be photographic film exposed to varying amounts of light resulting in an absorbent gradient. Alternatively, the absorbent material could be composed of dielectric coating material, such as graphite or carbon black. In addition, an absorbent graded aperture 50 may be used in conjunction with a phase plate, serrated aperture, or birefringent beam shaper.

Figure 6:
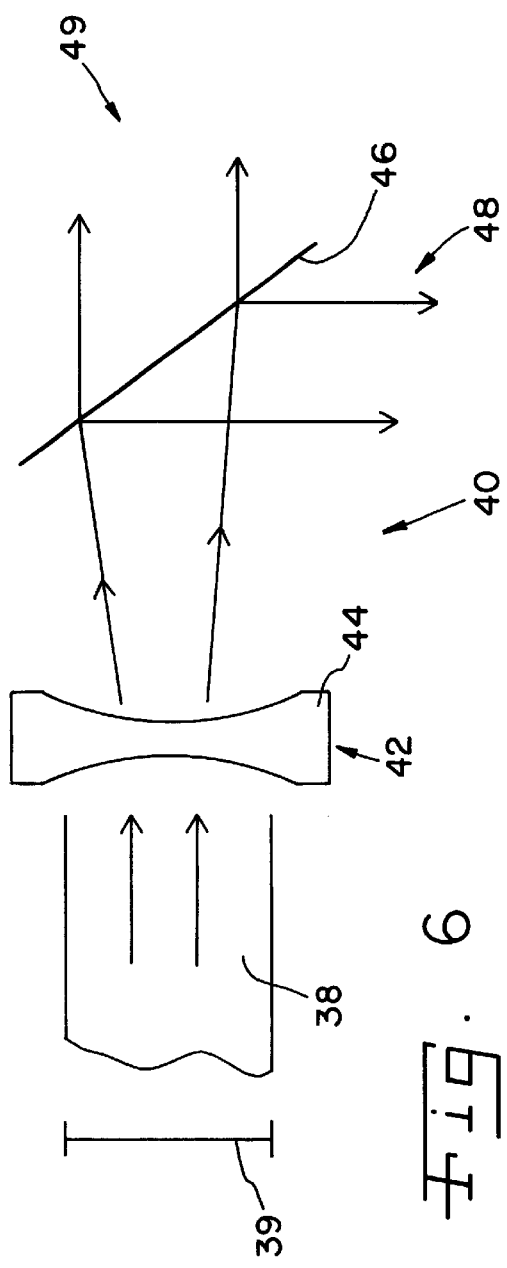
FIG. 6 is a cross-sectional view of birefringent beam shaper.

Referring now to FIG. 6, oscillator apodizer 16 and amplifier apodizer 28, alternatively, may be a birefringent beam shaper 40. Birefringent beam shaper 40 is composed of a birefringent lens 42, in combination with polarizer 46. Birefringent lens 42 is composed of birefringent material 44. Typically, birefringent material 44 is quartz which has two principal optical axes. The thickness of the birefringent lens 42 is a function of the radial coordinate. Therefore, the polarization of laser beam 38 can be varied across its cross-section or diameter 39 as the laser beam passes through birefringent beam shaper 42. This variation in polarization translates into a variation in the transmission of polarizer 46. Polarizer 46 is oriented to reject a portion of laser beam 38. Depending on the polarization of laser beam 38 after laser beam 38 passes through birefringent lens 42, polarizer 46 rejects the part of the beam depicted as rejected portion 48 and transmits transmitted portion 49. By varying the shape and material of birefringent lens 42 and the orientation of polarizer 46, the beam spatial profile can be modified.

Figure 7:
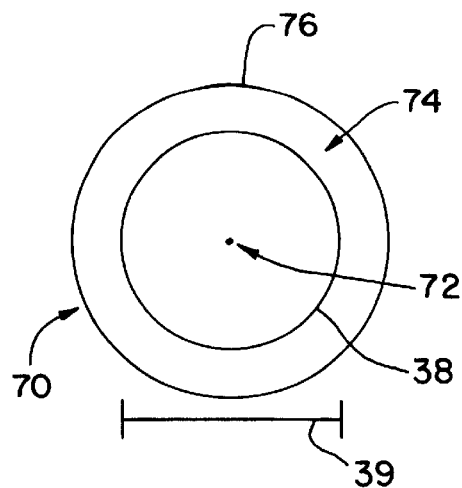
FIG. 7 is a cross-sectional view of a reflective graded aperture.

Referring now to FIG. 7, oscillator apodizer 16 and amplifier apodizer 28 may be a reflective graded aperture 70. Reflective graded aperture 70 contains an aperture center point 72 which is near 100 percent transparent to a laser beam. From a predetermined radius and proceeding to ever increasing radii is applied a reflective coating 74 in an increasing quantity. This creates a reflective gradient from near 0 percent reflectivity near reflective graded aperture center point 72 to near 100 percent reflective at the reflective graded aperture outer edge 76. The resulting reflective gradient provides for a soft iris. Photons from the center of beam diameter 39 pass freely through the center of reflective gradient aperture 70. Photons near the outer diameter of laser beam 38 become reflected by reflective coating 74. Reflective graded aperture 70 is placed at an angle so that the light will not go directly back into the laser.

Reflective coating 74 may be composed of multiple layers of two dielectric materials that differ by index of refraction. Possible materials include silica, tantala, hafnia, and titania. In addition, reflective graded aperture 70 may be used in conjunctive with a phase plate, serrated aperture, or birefringent beam shaper.

Figure 8A:
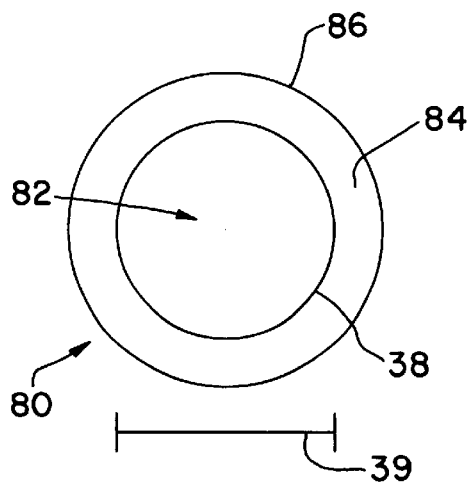
FIG. 8a is a cross-sectional view of a phase plate apodizer.

Referring to FIG. 8a, oscillator apodizer 16 and amplifier apodizer 28 may be composed of a phase plate 80. A phase plate apodizer 80 is an optical window that is transparent immediately surrounding in the center 82 but has a graded, randomly amplitude modulated edge 84. The modulation can be produced by a high-pressure spray of fine abrasive particles. For example, silicon oxide can be used as an abrasive to etch the phase plate. Alternately, aluminum oxide, sodium bicarbonate or silicon carbide maybe used as an etching abrasive. By increasing the duration of treating phase plate 80 with a spray of abrasive particles, deeper or an increased amplitude of etching occurs. To create the graded, randomly amplitude modulated edge 84, a shorter duration of processing is accomplished, at radii center 82, with increasing processing time at increasing radii.

Figure 8B:
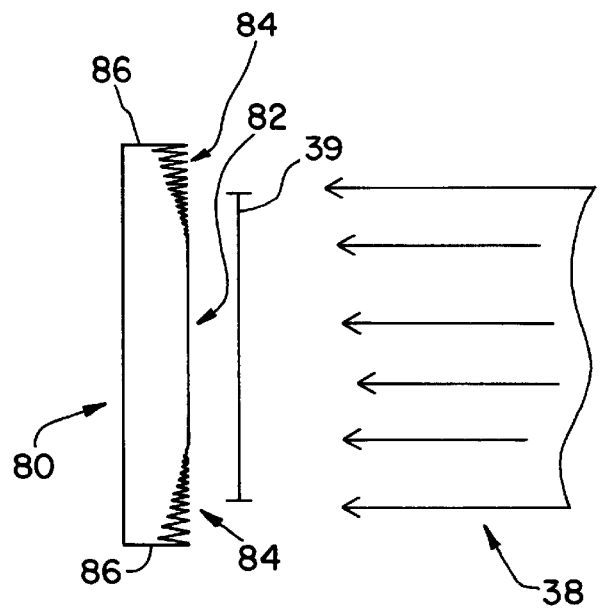
FIG. 8b is a cross-sectional view of the phase plate of FIG. 8a at a perpendicular axis.

FIG. 8b depicts a cross-sectional view of phase plate aperture 80 shown in FIG. 8a. Randomly amplitude modulator edge 84 has a maximum etching at the outer most radii 86 and a minimum etching at center 82.

Phase plate 80 works by randomly scattering light from the edge of the laser beam 38. Any light that reenters the beam is now incoherent. The diameter of a laser beam passing through the apodizer can be controlled by adjusting the width (i.e. how far radially the amplitude modulator edge proceeds towards center 82) of the amplitude modulated edge 84. The portion of laser beam 38 passing through phase plate 80 where randomly amplitude modulated edge 84 is absent proceeds through phase plate apodizer substantially unaltered.

The present invention uses an apodizer to reduce potential damage to laser gain medium optics. In the traditional process of forming a laser beam for laser shock processing, the laser beam experiences discontinuities. These discontinuities are produced when the diameter of the laser beam exceeds the diameter of the optical components through which the laser beam passes. Light is diffracted from the edges of these components into the laser beam whereby creating a modulation of the beam. The modulation produces diffraction effects that increases the divergence of the beam and causes hot spots to form within the beam. Such hot spots can rise to an intensity level that may damage optical components and coatings. The present invention uses an apodizer to decrease the diameter on the laser beam while reducing the amount of light reflected back into the laser beam path.

While the means disclosed here for reducing damage to gain medium is that of an apodizer, other suitable components may be used which result in a decrease potential for damage to the gain medium or laser optical components. In addition, any number of combinations of the various types of apodizers may be used within oscillator 10 and amplifier 28 to achieve the desired laser spatial profile. Also, the various forms or types of apodizers may be combined or connected together or to form a single compound apodizer. For example, a phase plate may be combined with a serrated aperture, a birefringement beam shaper, an absorbent graded aperture, or a reflective graded aperture.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for laser peening a workpiece said apparatus comprising:
    a laser oscillator to develop a laser pulse;
    amplifier means for increasing energy of said laser pulse;
    means for preventing damage to one of said laser oscillator and said amplifier means; and
    a laser peening cell in which said laser pulse is applied to a workpiece.

2. An apparatus according to claim 1 wherein said laser oscillator is a single-transverse mode oscillator.

3. An apparatus according to claim 2 wherein said means for preventing damage to said laser oscillator and said amplifier means comprises an apodizer.

4. An apparatus according to claim 3 wherein said apodizer is disposed within said laser oscillator.

5. An apparatus according to claim 3 wherein said apodizer is disposed within said amplifier means.

6. An apparatus according to claim 1 wherein said laser oscillator is a multi-transverse mode oscillator.

7. An apparatus according to claim 6 wherein said means for preventing damage to said laser oscillator and said amplifier means comprises an apodizer.

8. An apparatus according to claim 7 wherein said apodizer is disposed within said laser oscillator.

9. An apparatus according to claim 7 wherein said apodizer is disposed within said amplifier means.

10. An apparatus according to claim 1 wherein said means for preventing damage to one of said laser oscillator and said amplifier means comprises an apodizer.

11. An apparatus according to claim 10 wherein said apodizer is a phase plate.

12. An apparatus according to claim 11 wherein said phase plate is connected with an absorbent graded aperture.

13. An apparatus according to claim 10 wherein said apodizer is a serrated aperture.

14. An apparatus according to claim 13 wherein said serrated aperture is connected with a phase plate having a serrated aperture.

15. An apparatus according to claim 10 wherein said apodizer is a birefringent beam shaper.

16. An apparatus according to claim 10 wherein said apodizer is an absorbent graded aperture.

17. An apparatus according to claim 10 wherein said apodizer is a reflective graded aperture.

18. An apparatus according to claim 10 wherein said apodizer is disposed within said laser oscillator.

19. An apparatus according to claim 10 wherein said apodizer is disposed within said amplifier means.

20. An apparatus according to claim 10 wherein said means for preventing damage to one of said laser oscillator and said amplifier means comprises at least two apodizers; said first apodizer disposed within said oscillator and said second apodizer disposed within said amplifier means.

21. An apparatus for laser peening a workpiece, said apparatus comprising:
    a laser oscillator to develop a laser pulse;
    an apodizer, said apodizer disposed within said laser oscillator;
    amplifier means for increasing energy of said laser pulse; and
    a laser peening cell in which said laser pulse is applied to a workpiece.

22. An apparatus according to claim 21 wherein said apodizer is a phase plate.

23. An apparatus according to claim 21 wherein said apodizer is a serrated aperture.

24. An apparatus according to claim 23 wherein said serrated aperture is connected with a phase plate.

25. An apparatus according to claim 21 wherein said apodizer is a birefringent beam shaper.

26. An apparatus according to claim 21 wherein said apodizer is an absorbent graded aperture.

27. An apparatus according to claim 26 wherein said absorbent graded aperture is connected with a phase plate.

28. An apparatus according to claim 21 wherein said apodizer is a reflective graded aperture.

29. An apparatus for laser peening a workpiece, said apparatus comprising:
    a laser oscillator to develop a laser pulse;
    amplifier means for increasing energy of the laser pulse;
    an amplifier apodizer, disposed within said amplifier means; and
    a laser peening cell.

30. An apparatus according to claim 29 further comprising an oscillator apodizer.

31. An apparatus according to claim 29 wherein said apodizer is a phase plate.

32. An apparatus according to claim 29 wherein said apodizer is a serrated aperture.

33. An apparatus according to claim 32 wherein said serrated aperture is a connected with phase plate.

34. An apparatus according to claim 29 wherein said apodizer is a birefringent beam shaper.

35. An apparatus according to claim 34 wherein said birefringent beam shaper is connected with a phase plate.

36. An apparatus according to claim 29 wherein said apodizer is an absorbent graded aperture.

37. An apparatus according to claim 29 wherein said apodizer is a reflective graded aperture.

38. A method for laser peening a workpiece, the method comprising the steps:
    generating a laser pulse from an oscillator;
    modifying said laser pulse with an apodizer to prevent damage to the oscillator;
    amplifying said laser pulse using amplifier; and
    directing said modified laser pulse to a workpiece in a laser peening cell.

39. The method of claim 38 further comprising the step of modifying said laser pulse to prevent damage to the amplifier.

40. The method of claim 39, wherein the step of modifying said laser pulse to prevent damage to the amplifier includes locating an apodizer within the amplifier.

41. A method for laser peening a workpiece, the method comprising the steps:

locating an apodizer within a laser oscillator;

generating a laser pulse from said laser oscillator;

amplifying said laser pulse; and directing said laser pulse to cause laser peening of the workpiece.

42. A method according to claim 41 wherein said step of amplifying said laser pulse utilizes an apodizer.

43. The method according to claim 41 further comprises locating an apodizer within a laser amplifier.

44. The method of claim 41 wherein said apodizer is a phase plate.

45. A method according to claim 41 wherein said apodizer is a serrated aperture.

46. A apparatus according to claim 41 wherein said apodizer is a birefringent beam shaper.

47. A method according to claim 46 wherein said birefringent beam shaper is connected with a phase plate.

48. A method according to claim 41 wherein said apodizer is an absorbent graded aperture.

49. A method according to claim 48 wherein said absorbent graded aperture is a connected with phase plate.

50. A method according to claim 41 wherein said apodizer is a reflective graded aperture.

51. A method for laser peening a workpiece, the method comprising the steps:

generating a laser pulse from a laser oscillator;

locating an apodizer within a laser amplifier;

amplifying said laser pulse; and directing said laser pulse to cause laser peening of the workpiece.

52. The method of claim 51 wherein said apodizer is a phase plate.

53. A method according to claim 51 wherein said apodizer is a serrated aperture.

54. A method according to claim 51 wherein said apodizer is a birefringent beam shaper.

55. A method according to claim 54 wherein said birefringent beam shaper is connected with a phase plate.

56. A method according to claim 51 wherein said apodizer is an absorbent graded aperture.

57. A method according to claim 56 wherein said apodizer is a reflective graded aperture.

58. A method according to claim 56 wherein said absorbent graded aperture is connected with a phase plate.

\* \* \* \* \*